US009602445B2

(12) United States Patent
Chhaochharia et al.

(10) Patent No.: US 9,602,445 B2
(45) Date of Patent: Mar. 21, 2017

(54) REAL-TIME TARGETED MESSAGES

(75) Inventors: Nikhil Chhaochharia, Bangalore (IN); George Paulose Koomullil, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 159 days.

(21) Appl. No.: 13/582,831

(22) PCT Filed: Jun. 20, 2011

(86) PCT No.: PCT/IB2011/052682
§ 371 (c)(1),
(2), (4) Date: Sep. 5, 2012

(87) PCT Pub. No.: WO2012/131443
PCT Pub. Date: Oct. 4, 2012

(65) Prior Publication Data
US 2013/0198299 A1    Aug. 1, 2013

(30) Foreign Application Priority Data
Mar. 30, 2011    (IN) .......................... 1023/CHE/2011

(51) Int. Cl.
*H04L 12/58*    (2006.01)
*G06Q 30/02*    (2012.01)
(52) U.S. Cl.
CPC ............ *H04L 51/04* (2013.01); *G06Q 30/02* (2013.01)
(58) Field of Classification Search
CPC ....... H04L 51/04; H04L 12/58; H04L 67/306; H04L 51/20; H04L 51/32; G06Q 30/02; G06Q 50/01; G06Q 50/12; H04M 2215/32; H04W 4/12; H04W 4/02; H04W 4/021; H04W 4/06; H04W 64/00
USPC .............. 709/200, 201–203, 223, 238; 705/1
See application file for complete search history.

(56) References Cited

U.S. PATENT DOCUMENTS

| 4,659,314 | A  | * | 4/1987  | Weinblatt ...................... 434/236 |
| 5,636,346 | A  | * | 6/1997  | Saxe .............................. 705/1.1 |
| 5,848,396 | A  | * | 12/1998 | Gerace .......................... 705/7.33 |
| 7,139,586 | B2 |   | 11/2006 | Kreitzer et al. |
| 8,457,043 | B2 | * | 6/2013  | Gromoll et al. .............. 370/328 |
| 8,611,935 | B2 | * | 12/2013 | Duarte .................. G06Q 50/01 455/466 |
| 2003/0028451 | A1 | * | 2/2003 | Ananian ........... G06F 17/30867 705/26.42 |
| 2003/0126108 | A1 |   | 7/2003 | Martino et al. |

(Continued)

FOREIGN PATENT DOCUMENTS

WO    2009097365 A1    8/2009

OTHER PUBLICATIONS

Cantador, Ivén, et al., A multi-purpose ontology-based approach for personalised content filtering and retrieval, 2006 Proceedings of the First International Workshop on Semantic Media Adaptation and Personalization, IEEE Computer Society, Washington, D.C., USA.

(Continued)

*Primary Examiner* — Sargon Nano
(74) *Attorney, Agent, or Firm* — Brundidge & Stanger, P.C.

(57) ABSTRACT

Technologies and implementations for providing real-time targeted messages are generally disclosed.

29 Claims, 8 Drawing Sheets

(56) References Cited

U.S. PATENT DOCUMENTS

| | | | |
|---|---|---|---|
| 2008/0215348 A1* | 9/2008 | Guldimann et al. | 705/1 |
| 2010/0017455 A1 | 1/2010 | Svendsen et al. | |
| 2010/0023338 A1 | 1/2010 | Petronelli et al. | |
| 2010/0094496 A1* | 4/2010 | Hershkovitz | B60L 3/12 701/22 |
| 2010/0293057 A1* | 11/2010 | Haveliwala | G06Q 30/0269 705/14.66 |
| 2011/0195790 A1* | 8/2011 | Konkle | A63F 13/27 463/42 |
| 2011/0207440 A1* | 8/2011 | Ruuspakka | H04W 4/08 455/414.1 |
| 2011/0258049 A1* | 10/2011 | Ramer | G06F 17/30867 705/14.66 |
| 2011/0264536 A1* | 10/2011 | Chodroff et al. | 705/14.69 |
| 2012/0066064 A1* | 3/2012 | Yoder et al. | 705/14.53 |
| 2012/0066065 A1* | 3/2012 | Switzer | 705/14.53 |
| 2012/0179534 A1* | 7/2012 | Moukas et al. | 705/14.41 |
| 2012/0233631 A1* | 9/2012 | Geshwind | 725/1 |
| 2013/0057902 A1* | 3/2013 | Henry et al. | 358/1.15 |
| 2013/0218931 A1* | 8/2013 | Lewis | G06F 17/30289 707/803 |
| 2013/0231088 A1* | 9/2013 | Jabara et al. | 455/411 |
| 2013/0262268 A1* | 10/2013 | Gromoll et al. | 705/26.61 |
| 2014/0006161 A1* | 1/2014 | Jabara et al. | 705/14.57 |
| 2014/0025501 A1* | 1/2014 | Rothschild et al. | 705/14.64 |
| 2014/0057591 A1* | 2/2014 | Duarte | G06Q 50/01 455/404.2 |
| 2015/0297996 A1* | 10/2015 | Konkle | A63F 13/87 463/31 |

OTHER PUBLICATIONS

Stermsek, G., et al., User profile refinement using explicit user interest modeling, Proceedings of GI Jahrestagung (INFORMATIK) (1), Sep. 2007, pp. 289-293, Bremen, Germany.

Beach, A., et al., SocialFusion: Context-aware inference and recommendation by fusing mobile, sensor, and social data, Dec. 2009, Department of Computer Science, University of Colorado at Boulder, Technical Report CU-CS-1059-09, accessed online on Dec. 5, 2011 via http://www.aaronbeach.com/publications/CU-CS-1059-09.pdf.

Senot, C., et al., Analysis of strategies for building group profiles, Lecture Notes in Computer Science, User Modeling, Adaptation and Personalization, 2010, vol. 6075, Springer.

Kim, J.K., et al., A group recommendation system for online communities, International Journal of Information Management, Jun. 2010, vol. 30, issue 3, pp. 212-219.

Garcia, Inma, et al., A group recommender system for tourist activities, Lecture Notes in Computer Science, E-Commerce and Web Technologies, 10th International Conference, EC-Web 2009, vol. 5692, p. 26-37, Linz, Austria.

Turlier, S., et al., Aggregation and personalization of infotainment—an architecture illustrated with a collaborative scenario, 8th International Conference on Knowledge Management and Knowledge Technologies, Sep. 4, 2008, Graz, Austria.

Australian Patent Office, International Search Report & Written Opinion of the International Searching Authority for PCT/IB2011/052682, prepared on Oct. 21, 2011 and mailed on Oct. 25, 2011, Australia.

* cited by examiner

800 A computer program product

802 A signal bearing medium 804 at least one of identifying a group of intended users;

determining a first subset of the group of intended users;

generating a first aggregate profile based at least in part on user profiles of users in the first subset of the group of intended users;

determining a first message for the group of intended users based at least in part on the first aggregate profile;

transmitting the first message to a display device;

determining a second subset of the group of intended users;

generating a second aggregate profile based at least in part on user profiles of members in the second subset of the group of intended users;

determining a second message for the group of intended users based at least in part on the second aggregate profile;

transmitting the second message to at least one of the display device or a second display device;

transmitting the first aggregate profile to a device;

transmitting the second aggregate profile to the device or a second device;

receiving a first aggregate profile representative of a first subset of a group of intended users, wherein the user of the mobile device is a member of the group of intended users;

displaying the first message to a user of a device;

receiving a second aggregate profile representative of a second subset of the group of intended users; or displaying the second message to the user of the mobile device.

| 806 a computer-readable medium | 808 a recordable medium | 810 a communications medium |

Fig. 8

REAL-TIME TARGETED MESSAGES

CROSS-REFERENCE TO RELATED APPLICATIONS

The present application is a U.S. National stage filing under 35 U.S.C. § 371 of International Application No. PCT/IB11/52682, filed on Jun. 20, 2011 and claims priority under 35 U.S.C. § 119(a) to a corresponding patent application filed in India and having application number 1023/CHE/2011, filed on Mar. 30, 2011, the entire contents of which are herein incorporated by reference.

BACKGROUND

Unless otherwise indicated herein, the approaches described in this section are not prior art to the claims in this application and are not admitted to be prior art by inclusion in this section.

Real-time targeted messages may include messages that are targeted to individual users or a group of users. Typically, real-time targeted messages may be customized to the individual or group. However, such real-time targeted messaging techniques may be too slow for some implementations.

SUMMARY

In accordance with some implementations, methods for providing real-time targeted messages to a group may include determining a first subset of a group of intended users, generating a first aggregate profile based on user profiles of users in the first subset, determining a first message for the group of intended users based on the first aggregate profile, transmitting the first message to a device, determining a second subset of the group of intended users, generating a second aggregate profile based on user profiles of users in the second subset, determining a second message for the group of intended users based on the second aggregate profile, and transmitting the second message to the device or a second device.

In accordance with some implementations, methods for providing aggregate profiles for delivering real-time targeted messages to a group may include identifying a group of intended users, determining a first subset of the group of intended users, generating a first aggregate profile based on user profiles of user in the first subset, transmitting the first aggregate profile to a device, determining a second subset of the group of intended users, generating a second aggregate profile based on user profiles of users of the second subset, and transmitting the second aggregate profile to the device or a second device.

In accordance with some implementations, a machine readable medium may include instructions that, when executed, may cause the machine to provide real-time targeted messages by determining a first subset of a group of intended users, generating a first aggregate profile based on user profiles of users in the first subset, determining a first message for the group of intended users based on the first aggregate profile, transmitting the first message to a device, determining a second subset of the group of intended users, generating a second aggregate profile based on user profiles of users in the second subset, determining a second message for the group of intended users based on the second aggregate profile, and transmitting the second message to the device or a second device.

In accordance with some implementations, an apparatus may include a processor and a machine readable medium having stored therein instructions that, when executed, cause the apparatus to provide real-time targeted messages determining a first subset of a group of intended users, generating a first aggregate profile based on user profiles of users in the first subset, determining a first message for the group of intended users based on the first aggregate profile, transmitting the first message to a device, determining a second subset of the group of intended users, generating a second aggregate profile based on user profiles of users in the second subset, determining a second message for the group of intended users based on the second aggregate profile, and transmitting the second message to the device or a second device.

In accordance with some implementations, methods for providing real-time targeted messages to a user may include receiving a first aggregate profile representative of a first subset of a group of intended users, determining a first message based on the first aggregate profile, displaying the first message to the user of the mobile device, receiving a second aggregate profile representative of a second subset of the group of intended users, determining a second message based on the second aggregate profile, and displaying the second message to the user of the mobile device.

In accordance with some implementations, a machine readable medium may include instructions that, when executed, may cause the machine to provide real-time targeted messages to a group by receiving a first aggregate profile representative of a first subset of a group of intended users, determining a first message based on the first aggregate profile, displaying the first message to the user of the mobile device, receiving a second aggregate profile representative of a second subset of the group of intended users, determining a second message based on the second aggregate profile, and displaying the second message to the user of the mobile device.

In accordance with some implementations, an apparatus may include a processor and a machine readable medium having stored therein instructions that, when executed, cause the apparatus to provide real-time targeted messages to a group by receiving a first aggregate profile representative of a first subset of a group of intended users, determining a first message based on the first aggregate profile, displaying the first message to the user of the mobile device, receiving a second aggregate profile representative of a second subset of the group of intended users, determining a second message based on the second aggregate profile, and displaying the second message to the user of the mobile device.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 8 illustrates an example computer program product; and

DETAILED DESCRIPTION

Figure 1:
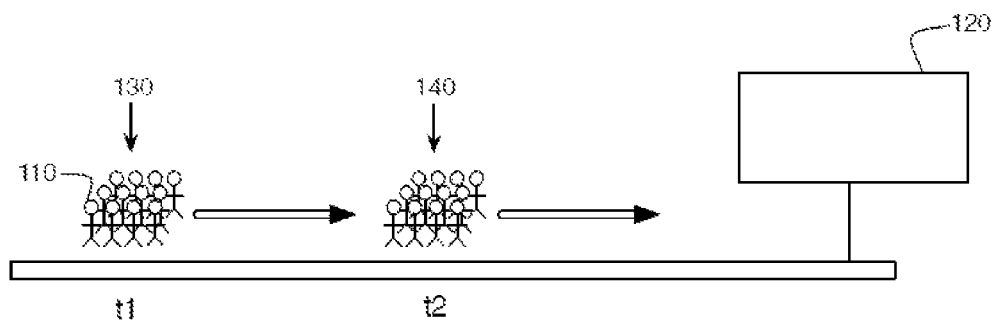
FIG. 1 is an illustration of an example use case for real-time targeted messaging.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to providing real-time targeted messages.

Real-time targeted messages may be delivered to an individual or a group. The real-time targeted messages may include text, images, audio, video, or a service and the messages may provide any variety of information such as, for example, advertisements, scores or schedules for sporting events, news, weather report, entertainment programs, or the like. In some examples, the content of real-time targeted messages may be based on the characteristics of the users in a targeted group. The timing of the real-time targeted messages may be important such that a quickly delivered message may be timely presented and applicable to a group while slower messages may be untimely or inapplicable to the targeted group. In some examples, a message may be quickly delivered by determining a first subset of the group of intended users of the targeted message. User profiles of users in the first subset may be used to generate an aggregate profile representative of the group of intended users. Therefore, instead of using an aggregate profile based on user profiles of all the users in the group of intended users, which may be time consuming, a subset of user profiles may be used such that a real-time targeted message may be timely delivered. Subsequently, user profiles of a second subset of the group of intended users may be used to generate a second aggregate profile of the group of intended users. The second aggregate profile may then be used to refine or replace the targeted message with a new message. Such iterative processing may continue as desired to provide a succession of refinements to the aggregate profile and real-time message.

FIG. 1 is an illustration of an example use case for real-time targeted messaging. As shown in FIG. 1, a group of intended users 110 may approach a display device 120. At time t1 intended users 110 may be at a location 130 and at time t2 intended users 110 may be at a location 140. In the illustrated example, the group of users may be approaching a billboard. At time t1, a first message may be displayed at display device 120 to intended users 110. In some examples, the first message may be generated quickly as the first group approaches and becomes within viewing range of display device 120 such that the message is timely and applicable for intended users 110. In general, the first message may be based on a coarse aggregate profile of intended users 110. Quickly generating and displaying the first message may allow for a maximum amount of time for intended users 110 to be exposed to the first message. In some examples, the first message may be determined by identifying a subset of the group of intended users 110, generating an aggregate profile based on user profiles of the subset of users and choosing a message relating to the aggregate profile.

As intended users 110 may approach display device 120, there may be more time for the generation of a real-time targeted message related to intended users 110. In some examples, at time t2, a second message may be displayed to intended users 110. The second message may be determined by identifying a second subset of the group of intended users 110, generating a second aggregate profile based on user profiles of the second subset of users and choosing a message relating to the second aggregate profile. In some examples, the second message may be based on a more detailed or finer aggregation of user profiles. In some examples, the finer aggregation may be based on using a greater number of users in the subset of users. In other examples, the finer aggregation may be based on using more detailed user profiles. In general, the first message displayed at display device 120 may be generated quickly based on a rough (but relatively accurate) aggregate profile and the second message displayed at device 120 may be based on an aggregate profile that may have been refined during the time between times t2 and t1. Such iterative processing may be repeated as many times as may be desirable or applicable for messaging to intended users 110. The real-time targeted messages may include any suitable information. In some examples, the real-time targeted messages may include an advertisement, a score of a sporting event, a schedule of sporting events, a news item, a weather report, an entertainment program, or the like. As shown in FIG. 1, in some examples, the group of intended users may be in a common geography. In other examples, the group of intended users may not have a common geography but may have a common trait such as a common age, a common gender, common interests, or the like.

Figure 2:
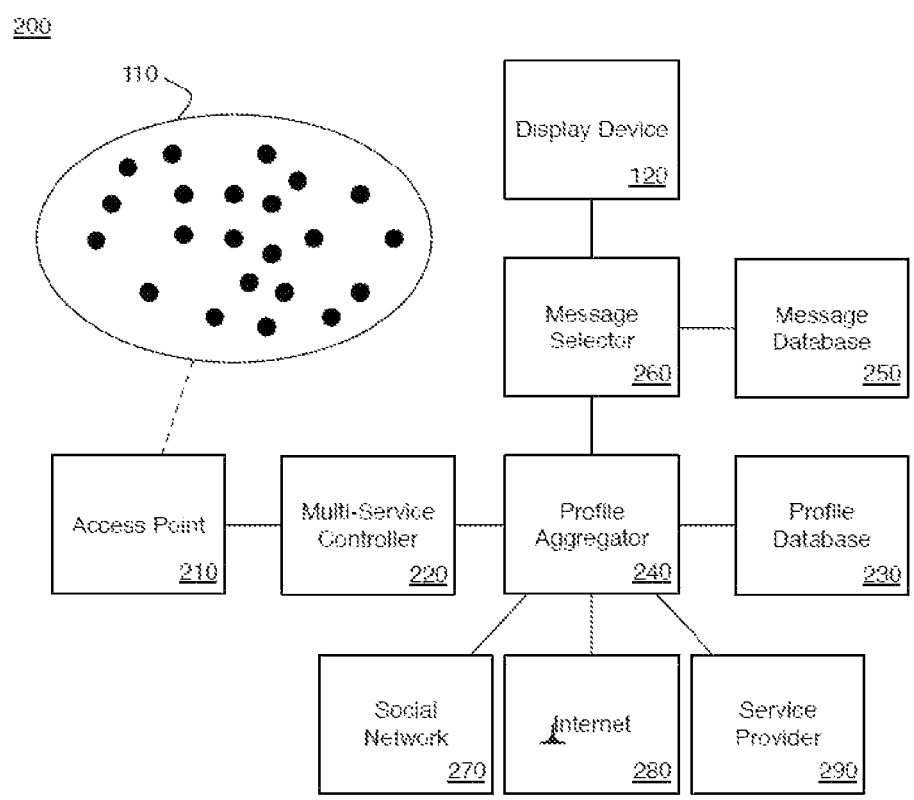
FIG. 2 is an illustration of an example system for providing real-time targeted messaging.

FIG. 2 is an illustration of an example system 200 for providing real-time targeted messaging. System 200 may include display device 120, an access point 210, a multi-service controller 220, a profile database 230, a profile aggregator 240, message database 250, a message selector 260, social network 270, the Internet 280, and a service provider 290. (In FIG. 2, the users in the group of intended users are represented by dots.) System 200 may provide real-time targeted messages to intended users 110. As shown, in some examples, access point 210 may be configured to be communicably coupled with intended users 110. In some examples, access point 210 may receive signals from the users' wireless devices. Multi-service controller 220 may be communicably coupled with access point 210 and may relate the received device signals to users to identify the users. Multi-service controller 220 may provide the user identities and other information, such as, for example, locations of the users.

Profile aggregator 240 may be communicably coupled with multi-service controller 220. Profile aggregator 240 may receive the identity of some or all of the users in the user group from multi-service controller 220. Profile aggregator may determine a subset of the users for generating an aggregate profile. In general, the chosen subset of users may be based on any suitable condition. In some examples, the determination of the subset may be based on a maximum distance between users of the group of intended users, a maximum age difference between users of the group of intended users, a maximum difference in a social trait between users of the group of intended users, or the like. In some examples, the subset may be chosen randomly. Profile aggregator 240 may receive user profile information from a variety of optional sources such as, for example, profile database 230, social network 270, the Internet 280 and/or service provider 290. In general, the user profiles may be primarily provided from profile database 230 which may be implemented as a database in a memory device. In general, the user profiles may include any suitable information for profiling a user such as, for example, age, gender, home address, income, interests, or the like. In general, the user profile may be kept confidential and various security techniques, such as encryption, may be used to maintain the privacy of the user profiles.

In some examples, profile aggregator 240 may use the user profiles for the subset of users to determine a pattern among the subset of users. In some examples, the pattern may be determined by statistically analyzing the user profiles of the subset of users. In an example, the pattern may be determined by averaging characteristics of the users. In general, profile aggregator 240 may generate an aggregate profile for the subset of users. In some examples, the aggregate profile may be based on the determined pattern or patterns. Profile aggregator 240 may be communicably coupled with message selector 260. In some examples, profile aggregator 240 may transmit to the aggregate profile to message selector 260. As is discussed further herein, in some examples, profile aggregator 240 may transmit the aggregate profile to a display device, audio device or another computing device, which may perform the message selection.

Message selector 260 may be communicably coupled with message database 250, which may be implemented as a database in a memory device. Message selector may use attributes of the aggregate profile to select a message from message database 250. The aggregate profile and the selected message may be correlated in any suitable manner such as, for example, by weighing characteristics in the aggregate profile to produce an array and choosing a message with a statistically similar array profile. Message selector 260 may be communicably coupled to display device 120. In some examples, message selector 260 may communicate the selected message to display device 120 for display to intended users 110.

As shown in FIG. 2, in some examples, a message may be displayed to users by a display device. In general, any suitable display device may be used. In some examples, the display device may be a visual display device. In some examples, the display device may be a computing device, a billboard, a stadium screen, a theater marquee, a restaurant sign, a museum sign, a mobile television, a wireless device, or the like. In other examples, the message may be provided to the users as audio. In such examples, the device may be an audio device. In some examples, the audio device may include a computing device having a speaker, a mobile television, or a wireless device, or a public address system, or the like.

In general, the process discussed may be repeated for intended users 110 such that successive iterations provide an opportunity for the system to provide a first, coarse approximation of the group for quick display and subsequent, finer approximations of the group for more accurate information to be provided to the group over time. Such methodology may provide both quick, coarse messages to a group and more accurate messages over time. In general, the group of intended users may include any number of users. In some examples, the group may be relatively small such that the group may include three to ten users. In other examples, tens, hundreds, thousands, or more users may be in the group of intended users.

As discussed with respect to FIG. 1 and FIG. 2, the systems and methods discussed herein may provide real-time targeted messages in a use case where a group may be walking toward a billboard. In general, real-time targeted messages may be provided in a wide variety of implementations. In some examples, real-time targeted messages may be provided to a group entering an event or a location. In some examples, real-time targeted messages may be provided to a group approaching a restaurant such that when users are relatively far from the restaurant, an external screen may show general restaurant promotions. As the users approach the restaurant, and successive iterations may be applied to the group, the screen may show promotions that may be applicable to the group. For example, for a group that may include people with an interest in vegetarian dining, vegetarian specials may be displayed to the group. In some examples, real-time targeted messages may be provided to a group of users entering a stadium for a sporting event. In some examples, real-time targeted messages may be provided to a group of passengers coming out of a train or an airplane. In some examples, real-time targeted messages may be provided to a group of customers entering a museum.

In some examples, real-time targeted messages may include targeted broadcasts that may provide marketing or news to a group of users present in a region or at an event. In some examples, real-time targeted messages may provide marketing to a group in a stadium or arena at the time of a scoring in a game. In some examples, real-time targeted messages may be provided to users in a region when two local sports teams are competing. In some examples, real-time targeted messages may be provided to updates, news or the like to a social group. In some examples, real-time targeted messages may be provided to a user group on a social networking service.

In general, a system for providing a real-time targeted message may include any combination of the components shown in FIG. 2. As is discussed further below, some of the components shown in FIG. 2 may be implemented in a computer or server. In some examples, some of the components of FIG. 2 may be implemented as hardware, firmware and/or software modules in a device that may include computing logic and memory. In general, the system may also include a transceiver for communicating with other devices. In some examples, a system may include a profile aggregator implemented in computing logic and memory and a transmission device. In some examples, a system may include an access point, a multi-service controller, and a profile aggregator. In some examples, a system may include an access point, a multi-service controller, a profile aggregator, and a message selector. In some examples, the message database and/or the profile database may be integrated in the system. In other examples, the databases may be external and may communicate with the system. In some examples, the display device may be integral with the system. In some examples, the display device may be a separate device communicably coupled to the system.

Figure 3:
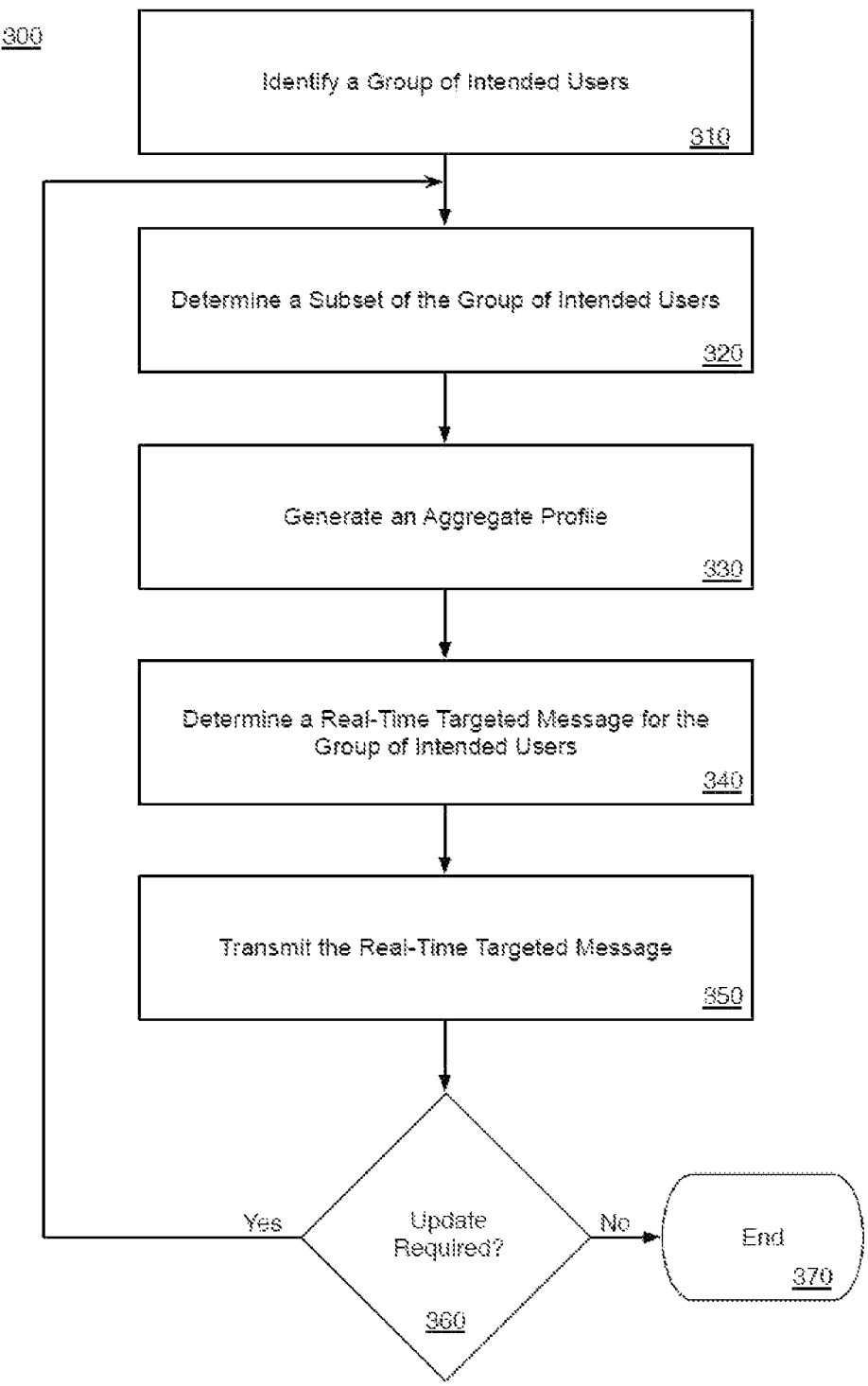
FIG. 3 is an illustration of a flow chart of an example method for providing real-time targeted messages to a group.

FIG. 3 is an illustration of a flow chart of an example method 300 for providing real-time targeted messages to a group. Method 300 may include one or more functions, operations or actions as illustrated by one or more of blocks 310, 320, 330, 340, 350, 360 and/or 370. In some examples, method 300 may be implemented at a device or system such as, for example, a server. In some examples, the system may include some of the components discussed above with respect to FIG. 2. The process of method 300 may begin at block 310.

At block 310, "Identify a Group of Intended Users", a group of intended users of a real-time targeted message may be identified. In general, the group of intended users may be identified in any suitable manner. In some examples, the group of intended users may be identified based on signals received from the users' wireless devices. In some examples, the group of intended users may be identified using image or video identification techniques. In some examples, the group of intended users may have been pre-identified based on a commonality, such as, for example, having tickets to an entertainment or sporting event, having reservations at a business establishment, having identified being a participant at an event through a social networking application, or the like. In some examples, the group of intended users may be identified based on a common geography, a common social trait, a common gender a common age range, or the like. In some examples, the group of intended users may include a group near a business establishment, a group of individuals near a vehicle, a group of passengers in vehicles that are in a geography, a group entering an establishment, or the like. In general, the group of intended users may have any number of members. In some examples, the group of intended users may be determined at a remote device and the identification of the group of intended users may be received at an implementing device or system. The process may continue at block 320.

At block 320, "Determine a Subset of the Group of Intended Users", a subset of the group of intended users may be determined. In general, the subset of the group of intended users may be identified in any suitable manner. In some examples, the subset of the group of intended users may be identified based on a maximum distance between users of the group of intended users, a maximum age difference between users of the group of intended users, a maximum difference in a social trait between users of the group of intended users, or the like. In some examples, the subset may be identified randomly. The process may continue at block 330.

At block 330, "Generate an Aggregate Profile", an aggregate profile may be generated based on user profile of users in the subset of intended users. In general, the aggregate profile may be generated in any suitable manner. In some examples, the aggregate profile may be generated by determining a pattern by statistically analyzing the user profiles of the subset of users. In an example, the pattern may be determined by averaging characteristics of the users, as is shown below with respect to Equation (1). In some examples, the aggregate profile may contain average values or weighted average values for various characteristic of users in the subset. In some examples, the aggregate profile may be based on determined pattern or patterns based on an analysis of the user profiles. The process may continue at block 340.

At block 340, "Determine a Real-Time Targeted Message for the Group of Intended Users", a real-time targeted message may be determined for the group of intended users. In general, a message may be chosen for the group of intended users based on the aggregate profile determined at block 330. The real-time targeted messages may include text, images, audio, video or a service and the messages may provide any variety of information such as, for example, advertisements, scores or schedules for sporting events, news, weather report, entertainment programs, or the like. The process may continue at block 350.

At block 350, "Transmit the Real-Time Targeted Message", the real-time targeted message may be transmitted to a device. In general, the real-time targeted message may be transmitted using any suitable technique, such as, for example, wired or wireless transmission. In some examples, the real-time targeted message may be transmitted to a visual display device. The real-time targeted message may be transmitted to any suitable display device such as, for example, a computing device, a billboard, a stadium screen, a theater marquee, a restaurant sign, a museum sign, a mobile television, a wireless device, or the like. In some examples, the real-time targeted message may be transmitted to an audio device such as a speaker at a computing device, a mobile television, or a wireless device, or a public address system. In some examples, the display or audio device may be a public device intended to display to a public space and a plurality of people or users. In some examples, the display or audio device may be a private device intended for a single user. In some examples, the real-time targeted message may be transmitted to multiple devices simultaneously. The process may continue at block 360.

At block 360, "Update Required?", a decision may be made as to whether an update to the real-time targeted message may be required. In general, the decision at block 360 may be made based on any suitable criteria. In some examples, the decision may be made using a counter such that a predetermined number of repetitions may be completed for the group of intended users. In various examples, the number of repetitions may be two, three, four, or more. In some examples, the decision may be based on feedback from the intended users such as, for example, social networking updates, an audio or video evaluation of the group (e.g., cheering or booing, chatter, group dispersion or concentration of the group, or the like). In some examples, the decision may be based on whether the group may be within viewing distance of the display. If it is determined an update may not be required, method 300 may end at block 370. Method 300 may be repeated for another identified group of intended users, for example. If an update may be required, the process may continue at block 320.

At block 320, "Determine a Subset of the Group of Intended Users", a second subset of the group of intended users may be determined. In general, subsequent passes through method 300 may provide more information for the aggregate profile and the selected real-time targeted message. In some examples, the second subset of the group of intended users may have more users or members than the previous subset of the group of the intended users, as is discussed further below with respect to FIGS. 6 and 7. In some examples, the second subset of the group of intended users may have equal or fewer users than the first subset of the group of intended users but the user profiles of users in the second subset of the group of intended users may include more information than the user profiles of users in the previous subset of the group of intended users. Any of the methods discussed herein may be used for determining the second subset of the group of intended users. The process may continue at block 330.

At block 330, "Generate an Aggregate Profile", a second aggregate profile may be generated based on user profile of users in the subset of intended users. In general, the second aggregate profile may include a more accurate profile of the group of intended users. Any of the methods discussed herein may be used to generate the second aggregate profile. In some examples, a replacement aggregate profile may be generated. In other examples, the second aggregate profile may update or change the first aggregate profile. The process may continue at block 340.

At block 340, "Determine a Real-Time Targeted Message for the Group of Intended Users", a second real-time targeted message may be determined for the group of intended users. In general, the second real-time targeted message may be chosen for the group of intended users based on the second aggregate profile determined at block 330. Any of the methods discussed herein may be used to determine the second real-time targeted message. The process may continue at block 350.

At block 350, "Transmit the Real-Time Targeted Message", the second real-time targeted message may be transmitted to a device. In some examples, the device may be the same device the first real-time targeted message was sent to. In some examples, the second real-time targeted message may be sent to a different device. The second device may include any of the display devices or audio devices discussed herein. In some examples, the second real-time targeted message may replace the first real-time targeted message and a replacement message may be transmitted. In other examples, an update may be transmitted such that the first real-time targeted message may be altered to generate the second real-time targeted message. Any of the methods discussed herein may be used to transmit the second real-time targeted message or the message update. The process may continue at block 360.

At block 360, "Update Required?", a decision may be made as to whether any additional updates may be required. Any of the methods discussed herein may be used to determine whether an additional update or updates are required. If it is determined an update may not be required, method 300 may end at block 370. If an update may be required, the process may continue at block 320. The process may continue in such a fashion until the necessary updates are completed.

Figure 4:
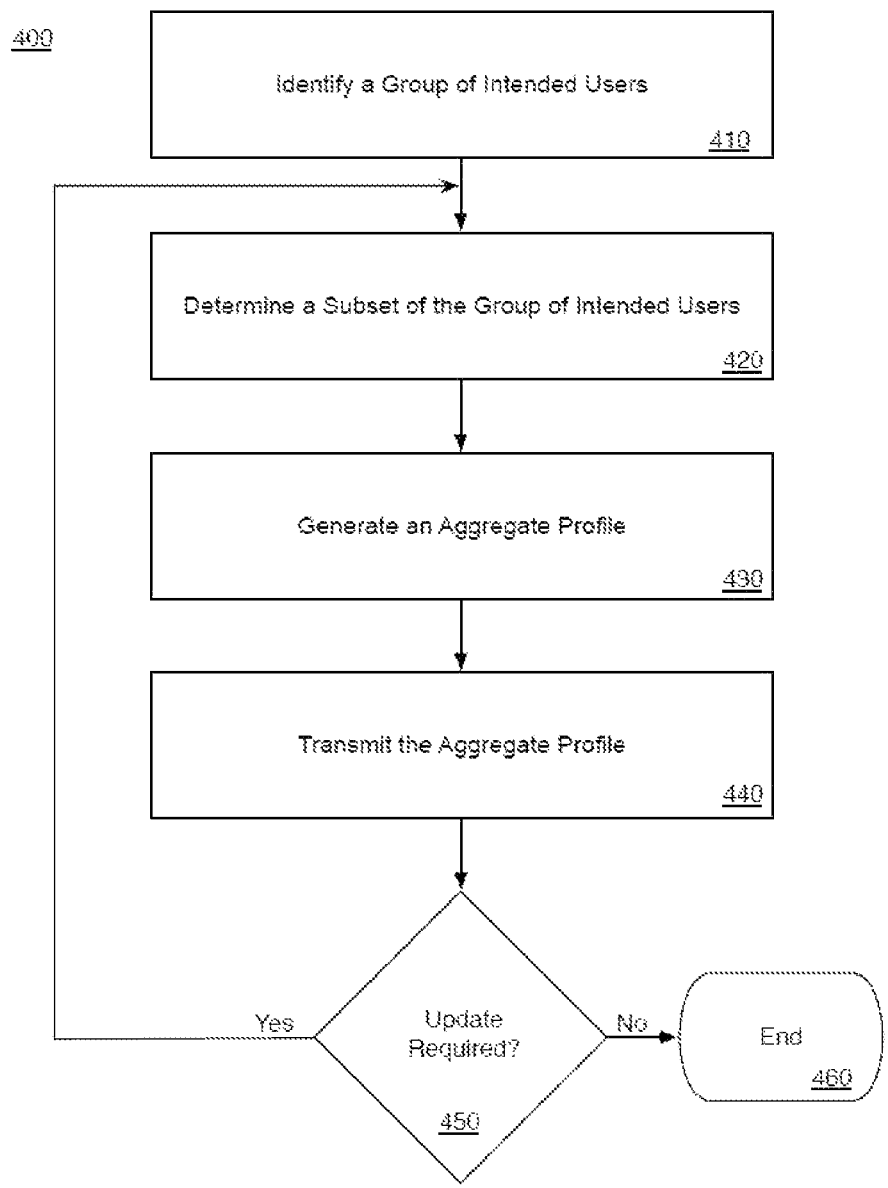
FIG. 4 is an illustration of a flow chart of an example method for providing aggregate profiles that may be used to deliver real-time targeted messages to a group.

FIG. 4 is an illustration of a flow chart of an example method 400 for providing aggregate profiles that may be used to deliver real-time targeted messages to a group. Method 400 may include one or more functions, operations or actions as illustrated by one or more of blocks 410, 420, 430, 440, 450 and/or 460. In some examples, method 400 may be implemented at a device or system such as, for example, a server. The process of method 400 may begin at block 410.

At block 410, "Identify a Group of Intended Users", a group of intended users of a real-time targeted message may be identified. In general, the group of intended users may be identified in any suitable manner. In general, any of the techniques discussed herein with respect to FIG. 3 at block 310 may be used to identify the group of users. The process may continue at block 420. At block 420, "Determine a Subset of the Group of Intended Users", a subset of the group of intended users may be determined. In general, the group of intended users may be identified in any suitable manner. In general, any of the techniques discussed herein with respect to FIG. 3 at block 320 may be used to identify the group of users. The process may continue at block 430.

At block 430, "Generate an Aggregate Profile", an aggregate profile may be generated based on user profile of users in the subset of intended users. In general, any of the techniques discussed herein with respect to FIG. 3 at block 330 may be used to identify the group of users. The process may continue at block 440.

At block 440, "Transmit the Aggregate Profile", the aggregate profile may be transmitted to a device such as, for example, a display device, an audio device, a computing device, a mobile device, or the like. In general, the aggregate profile may be transmitted using any suitable technique, such as, for example, wired or wireless transmission techniques. The aggregate profile may be transmitted to any suitable device that may use the aggregate profile to determine a message for display to a group of intended users or to a single user of the device. In some examples, the device may be a computing device, a billboard, a stadium screen, a theater marquee, a restaurant sign, a museum sign, a mobile television, a wireless devices or the like. In some examples, the device may be a public device intended to display to a public space and a plurality of people or users. In some examples, the device may be a private device intended for a single user. In some examples, the aggregate profile may be transmitted to multiple devices simultaneously. In some examples, the device may use computing functionality to determine a message for display. In other examples, the device may use access to another device to compute the message for display such that the device may transmit the aggregate profile to the computing device and receive a message for display from the computing device. The process may continue at block 450.

At block 450, "Update Required?", a decision may be made as to whether an update to the aggregate profile may be required. In general, the decision at block 450 may be made based on any suitable criteria. In some examples, the decision may be made using a counter such that a predetermined number of repetitions may be completed for the group of intended users. In various examples, the number of repetitions may be two, three, four, or more. In some examples, the decision may be based on feedback from the device. If it is determined an update may not be required, method 400 may end at block 460. Method 400 may be repeated for another identified group of intended users, for example. If an update may be required, the process may continue at block 420.

At block 420, "Determine a Subset of the Group of Intended Users", a second subset of the group of intended users may be determined. In general, subsequent passes through method 400 may provide more information for the aggregate profile and the selected real-time targeted message. In some examples, the second subset of the group of intended users may have more users or members than the previous subset of the group of the intended users. In some examples, the second subset of the group of intended users may have equal or fewer users than the first subset of the group of intended users but the user profiles of users in the second subset of the group of intended users may include more information than the user profiles of users in the previous subset of the group of intended users. Any of the methods discussed herein may be used for determining the second subset of the group of intended users. The process may continue at block 430.

At block 430, "Generate an Aggregate Profile", a second aggregate profile may be generated based on user profile of users in the subset of intended users. In general, the second aggregate profile may include a more accurate profile of the group of intended users. Any of the methods discussed herein may be used to generate the second aggregate profile. In some examples, a replacement aggregate profile may be generated. In other examples, the second aggregate profile may update or change the first aggregate profile. The process may continue at block 440.

At block 440, "Transmit the Aggregate Profile", the second aggregate profile may be transmitted to a device. In some examples, the device may be the same device the first aggregate profile was sent to. In other examples, the second aggregate profile may be sent to a different device. The second device may include any of the devices discussed herein. In some examples, the second aggregate profile may be sent to a device. In some examples, the second aggregate profile may replace the first aggregate profile and a replacement aggregate profile may be transmitted. In other examples, an update may be transmitted such that the first aggregate profile may be altered to generate the second aggregate profile. Any of the methods discussed herein may be used to transmit the second real-time targeted message. The process may continue at block 450.

At block 450, "Update Required?", a decision may be made as to whether any additional updates may be required. Any of the methods discussed herein may be used to determine whether an additional update or updates are required. If it is determined an update may not be required, method 400 may end at block 460. If an update may be required, the process may continue at block 420. The process may continue in such a fashion until the necessary updates are completed.

Figure 5:
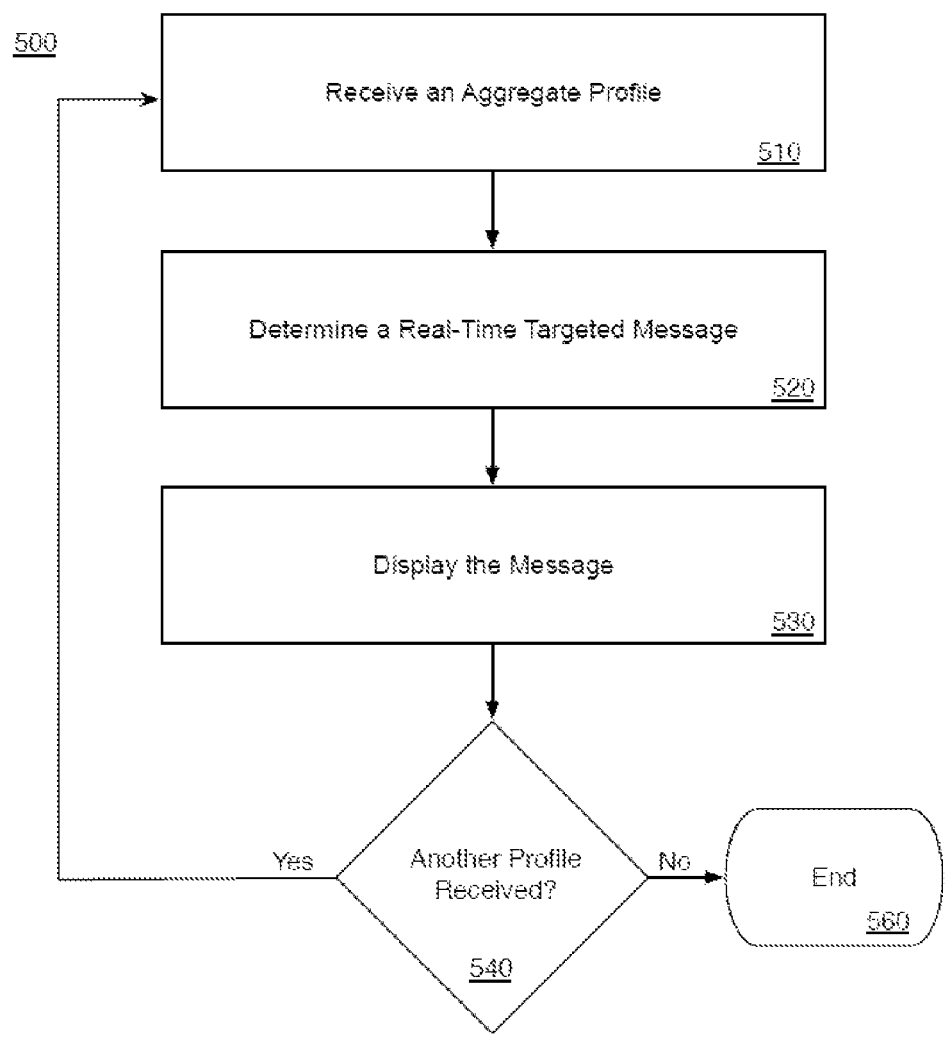
FIG. 5 is an illustration of a flow chart of an example method for using aggregate profiles to provide real-time targeted messages to a user or a group.

FIG. 5 is an illustration of a flow chart of an example method 500 for using aggregate profiles to provide real-time targeted messages to a user or a group. Method 500 may include one or more functions, operations or actions as illustrated by one or more of blocks 510, 520, 530, 540 and/or 560. In some examples, method 500 may be implemented at a device or system such as, for example, a display device, a mobile device including a display, an audio device, or a mobile device including a speaker. The process of method 500 may begin at block 510.

At block 510, "Receive an Aggregate Profile", an aggregate profile may be received at a device. In general, the real-time targeted message may be received using any suitable technique, such as, for example, wired or wireless communication techniques. The receiving device may be any suitable device that may use the aggregate profile to determine a message for display to a group of intended users or to a single user of the device. In some examples, the device may be a computing device, a billboard, a stadium screen, a theater marquee, a restaurant sign, a museum sign, a mobile television, a wireless devices or the like. In some examples, the device may be a public device intended to display to a public space and a plurality of people or users. In some examples, the device may be a private device intended for a single user. In some examples, the device may use computing functionality to determine a message for display. In other examples, the device may use access to another device to compute the message for display such that the device may transmit the aggregate profile to the computing device and receive a message for display from the computing device. The aggregate profile may include any of the aggregate profiles as discussed herein. The process may continue at block 520.

At block 520, "Determine a Real-Time Targeted Message", a real-time targeted message may be determined based on the received aggregate profile. In general, any suitable message may be chosen based on the aggregate profile received at block 520. The real-time targeted messages may include text, images, audio, video or a service and the messages may provide any variety of information such as, for example, advertisements, scores or schedules for sporting events, news, weather report, entertainment programs, or the like. In some examples, the message may be determined by a message selector module integrated in the device. The process may continue at block 530.

At block 530, "Display the Message", a message may displayed to a user or a group of users. In general, the message determined at block 520 may be displayed by any suitable device discussed herein. As discussed, in some examples, the message may be displayed to a single device user and, in other examples, the message may be displayed publicly such that a group of intended may view the message. The process may continue at block 540.

At block 540, "Another Profile Received?", it may be determined whether another profile may be received at the device. In general, the decision at block 540 may be made based on any suitable criteria. In some examples, the decision may be made based on a counter such that when a predetermined number of repetitions may be completed, the device may no longer receive another profile. In various examples, the number of repetitions may be two, three, four, or more. In some examples, the decision may be based on feedback from the intended users such as, for example, social networking updates, an audio or video evaluation of the group (e.g., cheering or booing, chatter, group dispersion or concentration of the group, or the like). If it is determined an update may not be required, method 500 may end at block 560. If it is determined another aggregate profile may be received, method 500 may be repeated for another received aggregate profile. Method 500 may repeat in a like manner until other aggregate profile may not be received.

As discussed, in some examples, method 400 of FIG. 4 may be performed at a computing device such as a server and method 500 of FIG. 5 may be performed at a display device, audio device, or a mobile device. In some examples, methods 400, 500 may be performed together such that a server and a display device, audio device or mobile device may be in communication to provide a real-time targeted message to a user or a group of users. For example, a server may perform the functions related to blocks 410, 420, 430 and 440 such that an aggregate profile may be transmitted. The display device, audio device or mobile device may perform the functions related to block 510 to receive the aggregate profile. The display device, audio device or mobile device may then perform the functions related to blocks 520 and 530 to determine a real-time targeted message and display the message or provide audio of the message to a user or group of intended users. The server and the display device, audio device or mobile device may communicate in any suitable manner such as, for example, wired or wireless communication.

Figure 6:
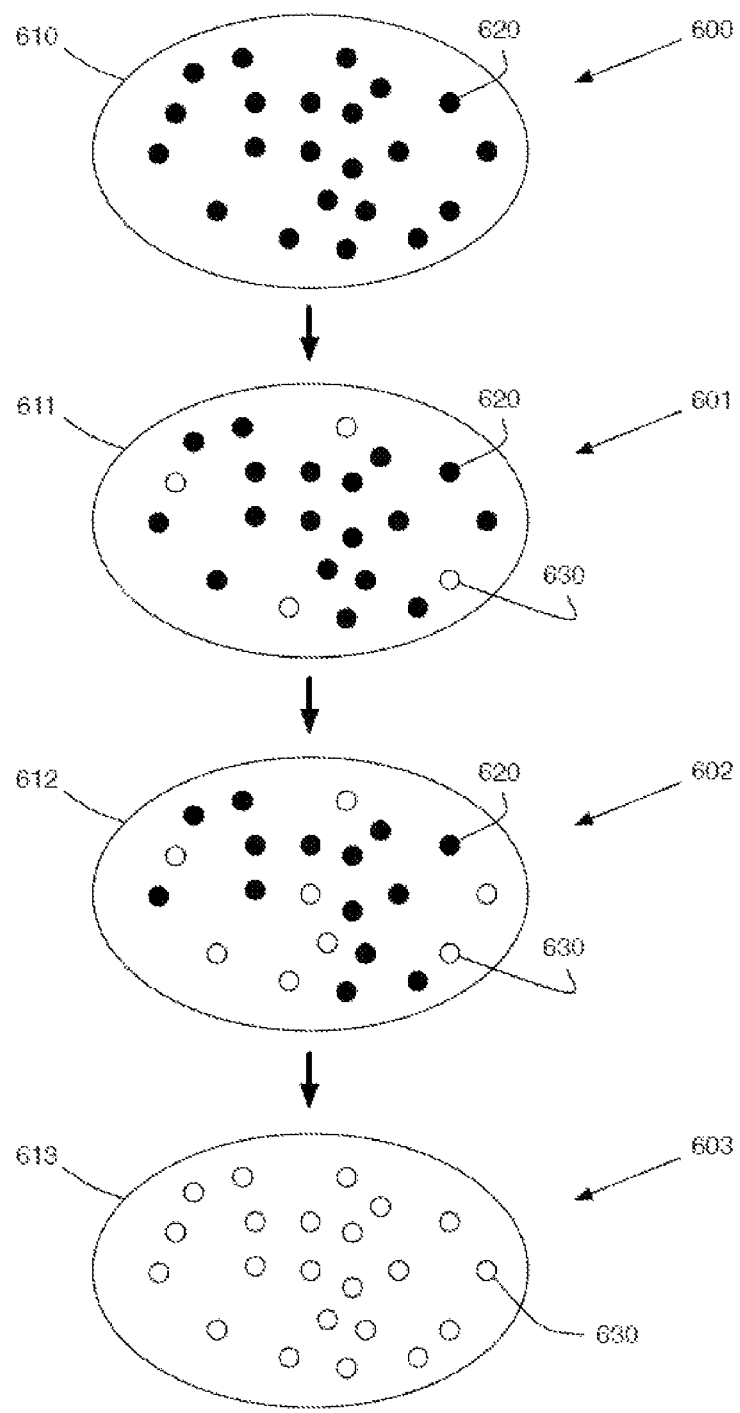
FIG. 6 is an illustration of example iterations of determining subsets of a group of intended users.

FIG. 6 is an illustration of example iterations of determining subsets of a group of intended users. As shown in FIG. 6, a group of intended users 610 related to a starting point 600 may include unselected members 620. The group of intended users 610 may have been determined using any of the methods discussed herein. In some examples, the group of intended users 610 may have been chosen based on a common geography, a common social trait, a common gender, a common age range, or the like. At iteration 601, a group of intended users 611 may include unselected members 620 and selected members 630. Selected members 630 may be selected using any suitable techniques discussed herein. In some examples, they may be selected based on a maximum distance between users of the group of intended users, a maximum age difference between users of the group of intended users, a maximum difference in a social trait between users of the group of intended users, or the like. As discussed, in some examples, a profile aggregator may receive user profiles of selected members 630. The profile aggregator may identify a pattern or pattern among selected members 630 and may create an aggregate profile representative of selected members and therefore representative of intended users 611. In some examples, the aggregate profile may be used to select a real-time targeted message.

At iteration 602, a group of intended users 612 may include unselected members 620 and selected members 630. As discussed herein, in some examples, subsequent iterations may provide more selected members as shown in FIG. 6. The additional selected members may be selected using any suitable technique or techniques. In some examples, the subsequent iteration may provide more selected members and more detailed user profiles for the selected members. As discussed with respect to iteration 601, in some examples, selected members 630 may be chosen based on a maximum distance between users of the group of intended users, a maximum age difference between users of the group of intended users, a maximum difference in a social trait between users of the group of intended users, or the like. The profile aggregator may receive user profiles of the selected members, identify a pattern or pattern among the selected members, and create an aggregate profile representative of selected members and therefore representative of intended users. The additional members in selected members 630 may provide additional information and therefore may provide an aggregate profile that is a more accurate representation of the group of intended users. At iteration 603, a group of intended users 613 may include selected members 630 such that user profiles of all the members of the group may be used by the profile aggregator to generate an aggregate profile representative of the group of intended users.

Figure 7:
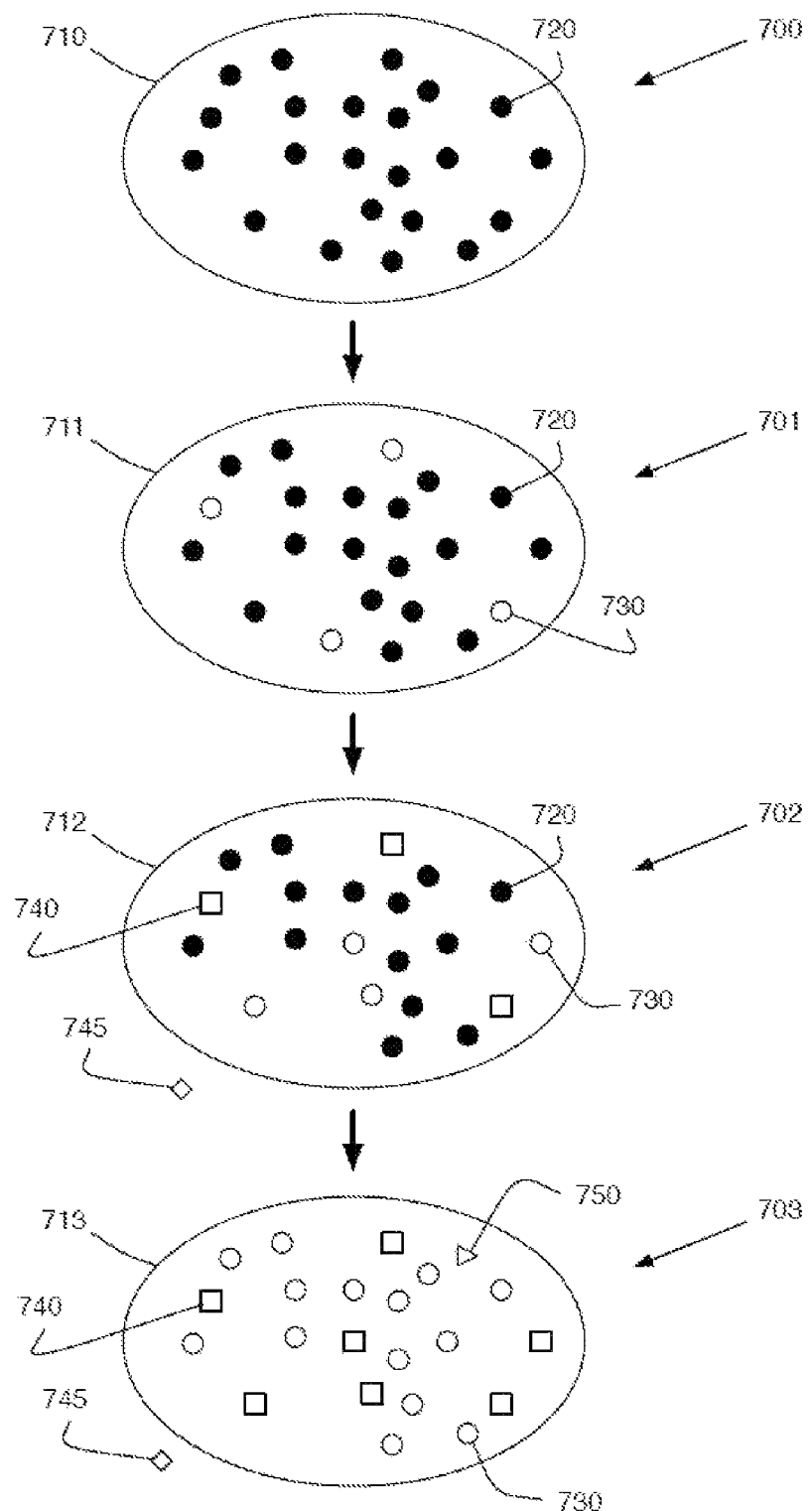
FIG. 7 is an illustration of example iterations of determining subsets of a group of intended users.

As illustrated in FIG. 6, in some examples, the group of intended users may include the same members throughout each of the iterations. In other examples, members may leave or join the group of intended users. FIG. 7 is an illustration of example iterations of determining subsets of a group of intended users. As shown in FIG. 7, a group of intended users 710 related to a starting point 700 may include unselected members 720. The group of intended users 710 may have been determined using any of the methods discussed herein. In some examples, the group of intended users 710 may have been chosen based on a common geography, a common social trait, a common gender, a common age range, or the like. At iteration 701, a group of intended users 711 may include unselected members 720 and selected members 730. Selected members 730 may be selected using any suitable techniques discussed herein. In some examples, they may be selected based on a maximum distance between users of the group of intended users, a maximum age difference between users of the group of intended users, a maximum difference in a social trait between users of the group of intended users, or the like. As discussed, in some examples, a profile aggregator may receive user profiles of selected members 730. The profile aggregator may identify a pattern or pattern among selected members 730 and may create an aggregate profile representative of selected members and therefore representative of intended users 711. In some examples, the aggregate profile may be used to select a real-time targeted message.

At iteration 702, a group of intended users 712 may include unselected members 720, previously selected members 740 and newly selected members 730. Member 745 may have departed from the group of intended users. As discussed herein, in some examples, subsequent iterations may provide more selected members as shown in FIG. 7. The additional selected members may be selected using any suitable technique or techniques. In some examples, the subsequent iteration may provide more selected members and more detailed user profiles for the selected members. The profile aggregator may receive user profiles of the selected members (including previously selected members 740 and newly selected members 730 but excluding departed member 745), identify a pattern or pattern among the selected members, and create an aggregate profile representative of selected members and therefore representative of intended users. The net gain of members may provide additional information and therefore may provide an aggregate profile that is a more accurate representation of the group of intended users.

At iteration 703, a group of intended users 713 may include previously selected members 740, newly selected members 730, and newly added and selected member 750. Member 750 may have joined the group between iteration 702 and 703, for example. The additional selected members may be selected using any suitable technique discussed herein. The newly added member or members may be detected and added using any suitable techniques discussed herein, such as, for example, receiving a signal from a wireless device, image detection, or the like. The profile aggregator may receive user profiles of the selected members (including previously selected members 740, newly selected members 730 and newly added and selected member 750), identify a pattern or pattern among the selected members, and create an aggregate profile representative of selected members and therefore representative of intended users. The net gain of members may provide additional information and therefore may provide an aggregate profile that is a more accurate representation of the group of intended users.

As discussed, in some examples, members may join or exit a group of intended users. The aggregate profile of the group may be determined based on value attributes that may be common for members of the group. For example, if many or most of the members of the group may be women the aggregate user profile may represent the target users as women or the age group of the members may be estimated by averaging the age of all members of the group. In some examples, the following steps may be used to estimate an aggregate value of a feature in consecutive steps through averaging. In some examples, several features may be aggregated simultaneously to generate an aggregate user profile.

For example, let $\bar{f}$ represent the aggregate value of feature values $f_1, f_2, \ldots, f_N$ of members of the group, then $$\bar{f} = \frac{1}{N} \sum_{k=1}^{N} f_k \quad (1)$$

where N may be the number of users used to determine the aggregate feature value and k may be a counter variable. For subsequent iterations, for example, let $N_{in}$ be the number of new users selected in the current iteration (e.g., because they may be newly selected or because they joined the group and may be newly selected) and let $N_{out}$ be the number of users selected in the previous iteration that may not be selected in the current iteration (e.g., because users departed the group), then, for the current iteration, $$\bar{f}' = \frac{1}{(N - N_{out} + N_{in})} \left[ N \cdot \bar{f} - \sum_{k=1}^{N_{out}} f_{N-k} + \sum_{k=1}^{N_{in}} f_{N+k} \right] \quad (2)$$

where N may be the number of users used to determine the aggregate feature value and k may be a counter variable. As shown, any members that joined the group but were unselected may not contribute to the aggregate feature value.

FIG. 8 illustrates an example computer program product 800 arranged in accordance with at least some embodiments of the present disclosure. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some implementations, signal bearing medium 802 may encompass a computer-readable medium 806, such as, but not limited to, a hard disk drive (HDD), a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). In some examples, signal bearing medium 802 may encompass a machine readable non-transitory medium.

Figure 9:
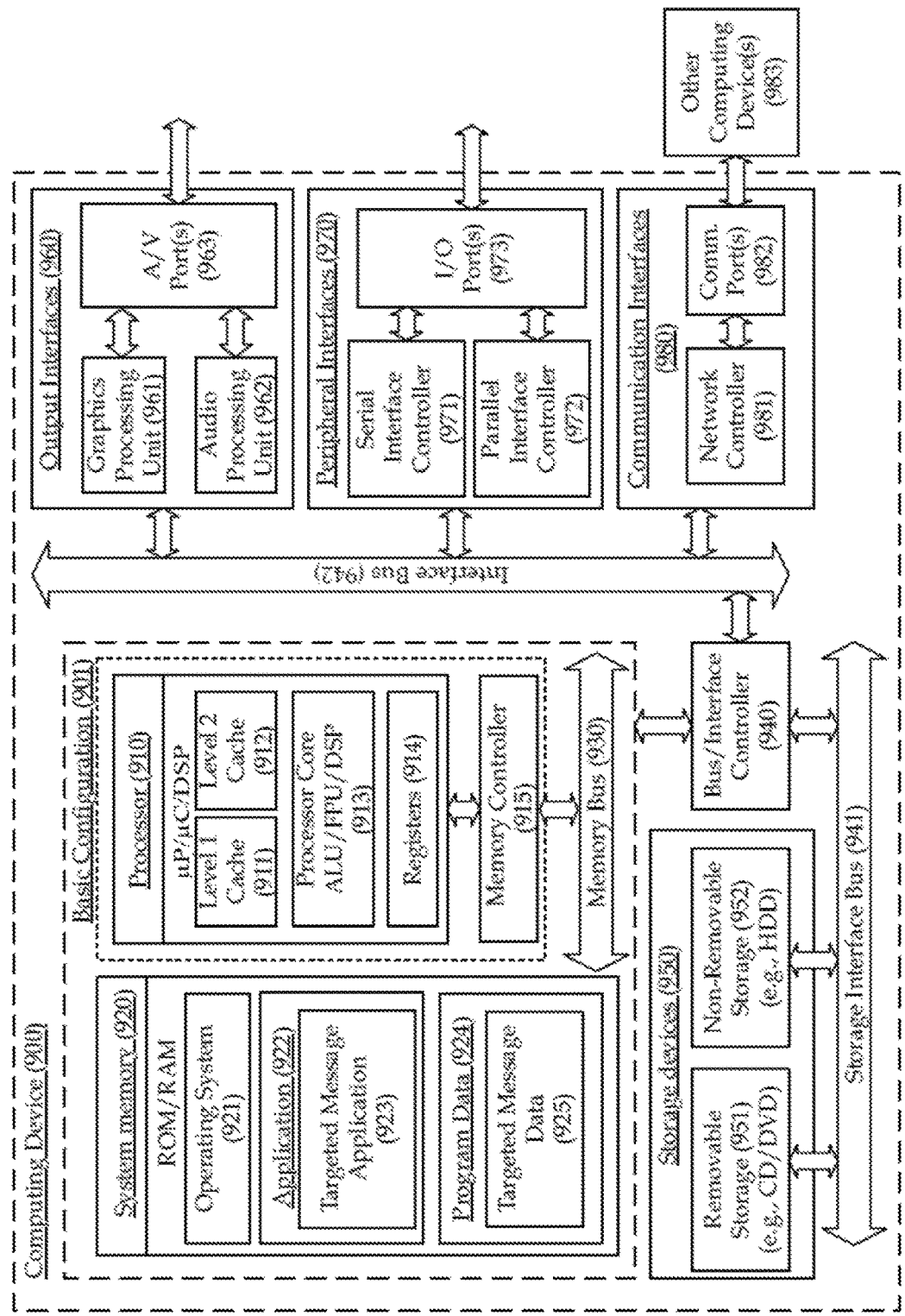
FIG. 9 is a block diagram illustrating an example computing device, all arranged in accordance with at least some embodiments of the present disclosure.

FIG. 9 is a block diagram illustrating an example computing device 900 arranged in accordance with at least some embodiments of the present disclosure. In various examples, computing device 900 may be configured to provide the operations discussed herein. In various examples, computing device 900 may be configured to provide the systems discussed herein. In an example, the devices discussed with respect to FIG. 9 may be provided as a part of computing device 900. In one example basic configuration 901, computing device 900 may include one or more processors 910 and system memory 920. A memory bus 930 can be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 can include one or more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include targeted message application 923 that can be arranged to perform the functions, actions, and/or operations as described herein including the functional blocks, actions, and/or operations described herein. Program data 924 may include targeted message data 925 for use with targeted message application 923. In some example embodiments, application 922 may be arranged to operate with program data 924 on an operating system 921. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more NV ports 963. Example peripheral interfaces 970 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 983 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for a server to provide real-time targeted messages to a group having a plurality of intended users, the method comprising:
    generating a first aggregate profile representative of the group based at least in part on user profiles of users in a first subset of the plurality of intended users, the first subset having fewer users than the plurality of intended users;
    determining a coarse message for the group based at least in part on the first aggregate profile;
    transmitting the coarse message to a first device;
    generating a second aggregate profile representative of the group based at least in part on user profiles of users in a second subset of the plurality of intended users;
    refining the coarse message into a refined message for the group based at least in part on the second aggregate profile; and
    subsequent to a passage of time from transmitting the coarse message to the first device, transmitting the refined message to at least one of the first device or a second device,
    wherein the first subset of the plurality of intended users is different from the second subset of the plurality of intended users.

2. The method of claim 1, wherein the first device comprises a non-interactive display device.

3. The method of claim 2, wherein the non-interactive display device comprises at least one of a computing device, a billboard, a stadium screen, a theater marquee, a restaurant sign, a museum sign, a mobile television, or a wireless device.

4. The method of claim 1, wherein the first device comprises an audio device.

5. The method of claim 4, wherein the audio device comprises at least one of a computing device having a speaker or a public address system.

6. The method of claim 1, wherein the second subset of the plurality of intended users has more users than the first subset of the plurality of intended users.

7. The method of claim 1, wherein the second subset of the plurality of intended users is not greater in number of users than the first subset of the plurality of intended users, and wherein the user profiles of the users in the second subset of the plurality of intended users includes more information than the user profiles of the users in the first subset of the plurality of intended users.

8. The method of claim 1, further comprising:
    identifying the group based on at least one of a common geography, a common social trait, a common gender, or a common age range of the plurality of intended users.

9. The method of claim 1, wherein an identification of the group is received from a remote device.

10. The method of claim 1, wherein the group comprises at least one of a group near a business establishment, a group of individuals near a vehicle, a group of passengers in vehicles that are in a geography, or a group entering an establishment.

11. The method of claim 1, further comprising:
    determining the first subset of the plurality of intended users based on at least one of a maximum distance between the users of the plurality of intended users, a maximum age difference between the users of the plurality of intended users, a maximum age difference between the users of the plurality of intended users, or a maximum difference in a social trait between the users of the plurality of intended users.

12. The method of claim 1, further comprising:
generating a third aggregate profile representative of the group based at least in part on user profiles of all users of the plurality of intended users;
newly refining the refined message for the group based at least in part on the third aggregate profile; and
transmitting the newly refined message to at least one of the first device, the second device, or a third device.

13. The method of claim 1, wherein the first subset of the plurality of intended users includes at least one user that is not a user of the second subset of the plurality of intended users.

14. The method of claim 1, wherein the transmitting the refined message, subsequent to the passage of time from transmitting the coarse message to the first device, includes transmitting the refined message to the first device.

15. A method for a server to provide aggregate profiles to deliver real-time targeted messages to a group having a plurality of intended users, the method comprising:
identifying the group having the plurality of intended users;
determining a first subset of the plurality of intended users;
generating a first aggregate profile representative of the group based at least in part on user profiles of users in the first subset of the plurality of intended users, the first subset having fewer users than the plurality of intended users;
transmitting the first aggregate profile to a first device;
determining a second subset of the plurality of intended users;
generating a second aggregate profile representative of the group based at least in part on user profiles of users in the second subset of the plurality of intended users; and
subsequent to a passage of time from transmitting the first aggregate profile, transmitting the second aggregate profile to at least one of the first device or a second device,
wherein the first subset of the plurality of intended users is different from the second subset of the plurality of intended users.

16. The method of claim 15, wherein the first device comprises at least one of a computing device, a billboard, a stadium screen, a theater marquee, a restaurant sign, a museum sign, a mobile television, or a wireless device.

17. The method of claim 15, wherein the transmitting the second aggregate profile comprises transmitting an update to the first aggregate profile.

18. A machine readable non-transitory medium having stored therein a plurality of instructions that, when executed, cause a machine to provide real-time targeted messages by performing operations comprising:
determining a first subset of a plurality of intended users in a group having the plurality of intended users, the first subset having fewer users than the plurality of intended users;
generating a first aggregate profile representative of the group based at least in part on user profiles of the users in the first subset of the plurality of intended users;
determining a coarse message for the group based at least in part on the first aggregate profile;
transmitting the coarse message to a first device;
determining a second subset of the plurality of intended users;
generating a second aggregate profile representative of the group based at least in part on user profiles of users in the second subset of the plurality of intended users;
refining the course message into a refined message for the group based at least in part on the second aggregate profile; and
subsequent to a passage of time from transmitting the coarse message to the device, transmitting the refined message to at least one of the first device or a second device,
wherein the first subset of the plurality of intended users is different from the second subset of the plurality of intended users.

19. The machine readable non-transitory medium of claim 18, further comprising instructions stored therein that, when executed, cause the machine to provide the real-time targeted messages by performing operations further comprising:
identifying the group having the plurality of intended users based on at least one of a common geography, a common social trait, a common gender, or a common age range of the plurality of intended users.

20. The machine readable non-transitory medium of claim 18, further comprising instructions stored therein that, when executed, cause the machine to provide the real-time targeted messages by performing operations comprising:
generating a third aggregate profile representative of the group based at least in part on the user profiles of all users of the plurality of intended users;
newly refining the refined message for the group based at least in part on the third aggregate profile; and
transmitting the newly refined message to at least one of the device, the second device, or a third device.

21. An apparatus comprising:
a processor; and
a non-transitory machine readable medium having stored therein a plurality of instructions that, when executed by the processor, cause the processor to provide real-time targeted messages by performance of operations comprising:
determine a first subset of a plurality of intended users in a group having the plurality of intended users, the first subset having fewer users than the plurality of intended users;
generate a first aggregate profile representative of the group based at least in part on user profiles of the users in the first subset of the plurality of intended users;
determine a coarse message for the group based at least in part on the first aggregate profile;
transmit the coarse message to a first device;
determine a second subset of the plurality of intended users;
generate a second aggregate profile representative of the group based at least in part on user profiles of users in the second subset of the plurality of intended users;
refine the coarse message into a refined message for the plurality of intended users based at least in part on the second aggregate profile; and
subsequent to a passage of time from transmission of the coarse message to the device, transmit the refined message to at least one of the first device or a second device,
wherein the first subset of the plurality of intended users is different from the second subset of the plurality of intended users.

22. The apparatus of claim 21, wherein the determination of the first subset of the plurality of intended users comprises a determination of the first subset of the plurality of intended users based on at least one of a maximum distance between the users of the plurality of intended users, a maximum age difference between the users of the plurality of intended users, or a maximum difference in a social trait between the users of the plurality of intended users.

23. The apparatus of claim 21, wherein the transmission of the refined message comprises includes a transmission of an update to the coarse message.

24. A method for a mobile device to provide real-time targeted messages to a user, the method comprising:
receiving a first aggregate profile representative of a group having a plurality of intended users based at least in part on user profiles of users in a first subset of the plurality of intended users;
wherein the first subset has fewer users than the plurality of intended users, and wherein the user of the mobile device is a member of the group;
determining a coarse message based at least in part on the first aggregate profile;
displaying the coarse message to the user of the mobile device;
receiving a second aggregate profile representative of the group based at least in part on user profiles of users in a second subset of the plurality of intended users;
refining the coarse message into a refined message based at least in part on the second aggregate profile; and
subsequent to a passage of time from displaying the coarse message to the user, displaying the refined message to the user of the mobile device,
wherein the first subset of the plurality of intended users is different from the second subset of the plurality of intended users.

25. The method of claim 24, wherein the message comprises at least one of an advertisement, a score of a sporting event, a schedule of sporting events, a news item, a weather report, or an entertainment program.

26. A machine readable non-transitory medium having stored therein a plurality of instructions that, when executed, cause a computing device in a mobile device to provide real-time targeted messages by performing operations comprising:
receiving a first aggregate profile representative of a group of a plurality of intended users based at least in part on user profiles of users in a first subset of the plurality of intended users, the first subset having fewer users than the plurality of intended users, wherein a user of the mobile device is a user of the plurality of intended users;
determining a coarse message based at least in part on the first aggregate profile;
displaying the coarse message to the user of the mobile device;
receiving a second aggregate profile representative of the group based at least in part on user profiles of users in a second subset of the plurality of intended users;
refining the coarse message into a refined message based at least in part on the second aggregate profile; and
subsequent to a passage of time from displaying the coarse message to the user, displaying the refined message to the user of the mobile device;
wherein the first subset of the plurality of intended users is different from the second subset of the plurality of intended users.

27. The machine readable non-transitory medium of claim 26, wherein the message comprises at least one of an advertisement, a score of a sporting event, a schedule of sporting events, a news item, a weather report, or an entertainment program.

28. A mobile device comprising:
a processor; and
a non-transitory machine readable medium having stored therein a plurality of instructions that, when executed, cause the processor of the mobile device to provide a real-time targeted message by performance of operations comprising:
receive a first aggregate profile representative of a group of a plurality of intended users based at least in part on user profiles of users in a first subset of the plurality of intended users, the first subset having fewer users than the plurality of intended users, wherein a user of the mobile device is a user of the plurality of intended users;
determine a coarse message based at least in part on the first aggregate profile;
display the coarse message to the user of the mobile device;
receive a second aggregate profile representative of the group based at least in part on user profiles of users in a second subset of the plurality of intended users;
refine the coarse message into a refined message based at least in part on the second aggregate profile; and
subsequent to a passage of time from display of the coarse message to the user, display the refined message to the user of the mobile device,
wherein the first subset of the plurality of intended users is different from the second subset of the plurality of intended users.

29. The apparatus of claim 28, wherein the message comprises at least one of an advertisement, a score of a sporting event, a schedule of sporting events, a news item, a weather report, or an entertainment program.

* * * * *

UNITED STATES PATENT AND TRADEMARK OFFICE
CERTIFICATE OF CORRECTION

| | | |
|---|---|---|
| PATENT NO. | : 9,602,445 B2 | Page 1 of 1 |
| APPLICATION NO. | : 13/582831 | |
| DATED | : March 21, 2017 | |
| INVENTOR(S) | : Chhaochharia et al. | |

It is certified that error appears in the above-identified patent and that said Letters Patent is hereby corrected as shown below:

In the Specification

In Column 17, Line 4, delete "NV ports" and insert -- A/V ports --, therefor.

In the Claims

In Column 22, Line 36, in Claim 21, delete "apparatus" and insert -- apparatus, --, therefor.

In Column 24, Line 20, in Claim 28, delete "device" and insert -- device, --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*